(12) United States Patent
Eun

(10) Patent No.: US 10,149,441 B2
(45) Date of Patent: Dec. 11, 2018

(54) STRAWBERRY GROWTH METHOD AND SYSTEM

(71) Applicant: Duk Ki Eun, Gyeongsangbuk-do (KR)

(72) Inventor: Duk Ki Eun, Gyeongsangbuk-do (KR)

( * ) Notice: Subject to any disclaimer, the term of this patent is extended or adjusted under 35 U.S.C. 154(b) by 310 days.

(21) Appl. No.: 15/165,069

(22) Filed: May 26, 2016

(65) Prior Publication Data

US 2017/0027111 A1 Feb. 2, 2017

(30) Foreign Application Priority Data

Jul. 29, 2015 (KR) ........................ 10-2015-0107539

(51) Int. Cl.

| A01G 29/00 | (2006.01) |
|---|---|
| A01G 9/10 | (2006.01) |
| A01G 25/02 | (2006.01) |
| A01G 22/00 | (2018.01) |
| A01G 9/029 | (2018.01) |

(52) U.S. Cl.
CPC ......... *A01G 9/1026* (2013.01); *A01G 9/0293* (2018.02); *A01G 22/00* (2018.02); *A01G 25/02* (2013.01)

(58) Field of Classification Search
CPC ...... A01G 9/1026; A01G 25/02; A01G 1/001; A01G 9/023; A01G 25/023; A01G 25/06
See application file for complete search history.

(56) References Cited

U.S. PATENT DOCUMENTS

| 2,651,143 A | * | 9/1953 | Esmay | A01G 9/023 47/33 |
|---|---|---|---|---|
| 2,756,541 A | * | 7/1956 | Berger | A01G 9/023 47/45 |
| 3,365,840 A | * | 1/1968 | Cooper | A01G 11/00 47/59 R |
| 6,470,625 B1 | * | 10/2002 | Byun | A01G 9/023 47/82 |
| 6,598,339 B1 | * | 7/2003 | Bish | A01G 31/06 47/59 R |
| 9,439,362 B2 | * | 9/2016 | Fisher | A01G 9/023 |
| 2003/0024159 A1 | * | 2/2003 | Nakamura | A01G 9/023 47/39 |
| 2007/0068073 A1 | * | 3/2007 | Holl | A01G 9/023 47/67 |

FOREIGN PATENT DOCUMENTS

| DE | 3315143 C1 | * | 11/1984 | .......... C05F 17/0205 |
|---|---|---|---|---|
| DE | 3447485 A1 | * | 7/1986 | ............ A01G 9/023 |
| JP | H10-323135 A | | 12/1998 | |
| JP | H11-155381 A | | 6/1999 | |
| JP | 2001-120069 | | 5/2001 | |
| JP | 4821313 B2 | | 11/2011 | |
| WO | WO-2012108365 A1 | * | 8/2012 | ............ A01G 7/045 |

* cited by examiner

*Primary Examiner* — Trinh T Nguyen
(74) *Attorney, Agent, or Firm* — KORUS Patent, LLC; Seong Il Jeong

(57) ABSTRACT

The present disclosure relates to a strawberry growth method and system using upper and lower strawberry growth modules wherein the most superior runner is selected from the mother strawberry plant on the upper level and then is guided into the lower level and the most superior runner becomes a new superior mother strawberry plant, thereby to produce improved fruits quality and yield.

8 Claims, 4 Drawing Sheets

STRAWBERRY GROWTH METHOD AND SYSTEM

CROSS-REFERENCE TO RELATED APPLICATION

This application claims the benefit of Korean patent application no. 10-2015-0107539, filed on Jul. 29, 2015, the entire content of which is incorporated herein by reference for all purposes as if fully set forth herein.

BACKGROUND

Field of the Present Disclosure

The present disclosure relates to a strawberry growth method and system using strawberry growth modules. More particularly, the present disclosure relates to a strawberry growth method and system using upper and lower strawberry growth modules wherein the most superior runner is selected from the mother strawberry plant on the upper level and then is guided into the lower level and the most superior runner becomes a new superior mother strawberry plant, thereby to produce improved fruits quality and yield.

Related Art

Typically, a strawberry plant may like a temperature below 25° C. The strawberry plant may produce ripe fruits after May. The strawberry plant may be awake from the sleep after around 50 to 200 hours at a cool temperature below 5° C.

In addition, a child strawberry plant planted in the fall may grow slightly and encounter the winter. The strawberry plant may grow until October to mid-December. In the winter, the plant somewhat grows. In the midwinter, the plant may have a dried leaf. In the March, the plant may re-grow fast and then in early April, the blooming may begin. After termination of the blooming, the plant may begin to create fruits.

Using the warm sunshine of May, the fruits goes ripe to become red. The strawberry plant may produce the fruits, but, in summer time, the production of the fruits may end. Instead, the plant may produce runners extending from the stem thereof. By removing the runners until early June, the strawberry plant may produce high quality fruits.

Regarding the strawberry growth method, the runner may be transplanted. In this connection, most farmers may raise the child strawberry plant in the arable land and then transplant the raised plant in another place.

Thus, since the strawberry farmers raise the child strawberry plant in the arable land, they must remove weeds grown with the child strawberry plant. Further, fertilizer feeding and water management are difficult, to lead to increased manpower and time consuming.

In order to overcome this problem, a growth pot may be used where a child strawberry plant may be raised to become the mother plant, which may produce the runners, which may be transplanted into another pots. This method may require a large quantity of pots. Further, many runners should be individually transplanted into individual ports. This may lead to increased manpower and time consuming.

Further, in order to re-transplant the child strawberry plant, the child strawberry plant may be removed from the pot. This may cause roots thereof to be set apart therefrom.

Therefore, instead of guiding the runners from the mother strawberry plant into the field or pot, the runners may be directly guided into growth modules wherein the runner may grow and may get nutrition. This may minimize human and material resources required for the strawberry raising. This may prevent injury of the child strawberry plant that can otherwise occur during the transferring of the child strawberry plant.

A prior art patent document may be as follows: Korea patent application No. 10-0797933 titled as "child strawberry plant cultivation.

This "Background" section is provided for background information only. The statements in this "Background" section are not an admission that the subject matter disclosed in this "Background" section constitutes prior art to the present disclosure, and no part of this "Background" section may be used as an admission that any part of this application, including this "Background" section, constitutes prior art to the present disclosure.

SUMMARY

From considerations of the above situations, the present disclosure provides a strawberry growth method and system, wherein instead of guiding the runners from the mother strawberry plant into the field or pot, the runners may be directly guided into growth modules wherein the runner may grow and may get nutrition. This may minimize human and material resources required for the strawberry raising.

The present disclosure provides a strawberry growth method and system, wherein the most superior runner is selected from the mother strawberry plant on the upper level and then is guided into the lower level and the most superior runner becomes a new superior mother strawberry plant, thereby to produce improved fruits quality and yield.

One aspect of the present disclosure provides a strawberry growth method comprising: providing a growth-module support including upper and lower levels; filling a first bed-soil in at least one first growth module; transplanting at least one mother strawberry plant into the at least one first growth module and then placing the at least one first growth module on the upper level of the support; or placing the at least one first growth module on the upper level of the support and then transplanting at least one mother strawberry plant into the at least one first growth module; watering or nutrition-feeding the mother strawberry plant in the first growth module, to allow strawberry runners to extend from the mother strawberry plant; filling a second bed-soil in at least one second growth module; placing the at least one second growth module on the lower level of the support; selecting the most superior runner from the multiple runners extending from the mother strawberry on the first growth module; guiding only the selected most superior runner into the at least one second growth module, to allow the selected most superior runner to be planted into the at least one second growth module; removing the first growth module from the support; and displacing the second growth module from the lower level to the upper level of the support; and growing the selected most superior runner on the upper level of the support to become a new mother strawberry plant.

In one embodiment, a watering pipe is disposed on the upper level of the support.

In one embodiment, each of the first and second growth modules include a support plate having multiple drain holes formed therein and an edge protrusion formed at an outer periphery thereof; and a hollow body having open top and bottom portion, and having a curved guide portion formed at an edge of the top portion.

In one embodiment, the hollow portion has a rectangular shape as viewed above.

In one embodiment, the hollow body is configured to be coupled or decoupled to or from the support plate.

In one embodiment, the at least one first growth module comprises plural first growth modules and the at least one second growth module comprises plural second growth modules.

In one embodiment, the first growth modules are arranged on the upper level in a linear or matrix manner, and the second growth modules are arranged on the lower level in a linear or matrix manner, wherein the arrangement of the second growth modules corresponds to the arrangement of the first growth modules.

In one embodiment, when displacing the second growth module from the lower level to the upper level of the support, the body of the second module is removed from the support plate and is displaced onto the upper level.

One aspect of the present disclosure provides a strawberry growth system comprising: a growth-module support including upper and lower levels; and at least one first and second growth modules disposed on the upper and lower levels of the support, wherein each of the first and second growth modules include a support plate having multiple drain holes formed therein and an edge protrusion formed at an outer periphery thereof; and a hollow body having open top and bottom portion, and having a curved guide portion formed at an edge of the top portion, wherein the hollow portion has a rectangular shape as viewed above, wherein the hollow body is configured to be coupled or decoupled to or from the support plate, wherein the at least one first growth module comprises plural first growth modules and the at least one second growth module comprises plural second growth modules, wherein the first growth modules are arranged on the upper level in a linear or matrix manner, and the second growth modules are arranged on the lower level in a linear or matrix manner, wherein the arrangement of the second growth modules corresponds to the arrangement of the first growth modules, wherein a watering pipe is disposed on the upper level of the support.

DETAILED DESCRIPTIONS

Figure 1:
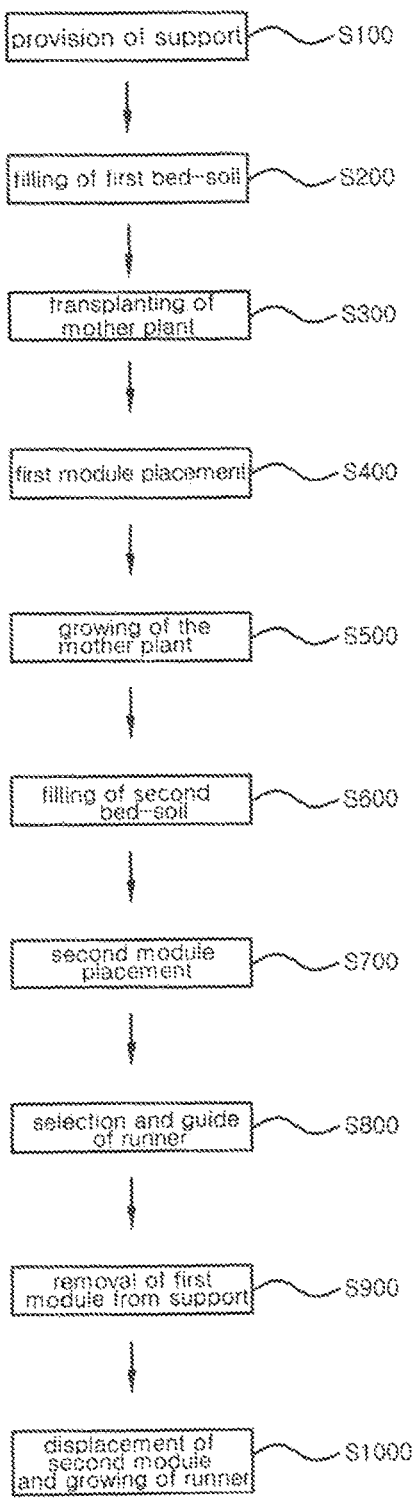
FIG. 1 illustrates a flow chart of a strawberry growth method in accordance with the present disclosure.
Figure 2:
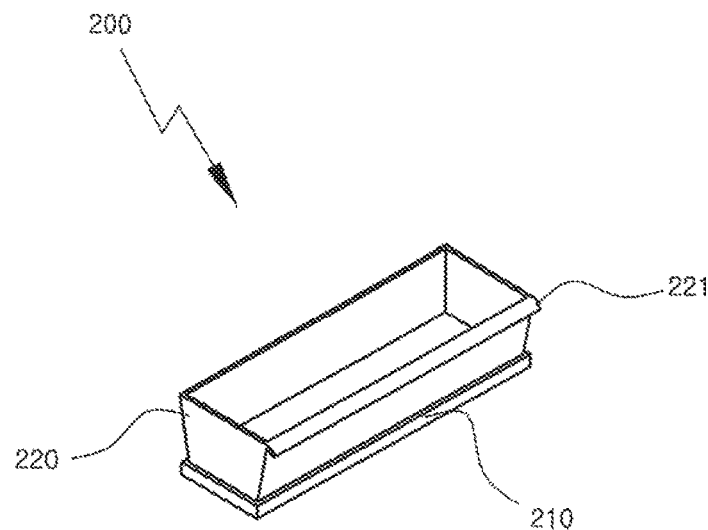
FIG. 2 illustrates a perspective view of a growth module in accordance with the present disclosure.
Figure 3:
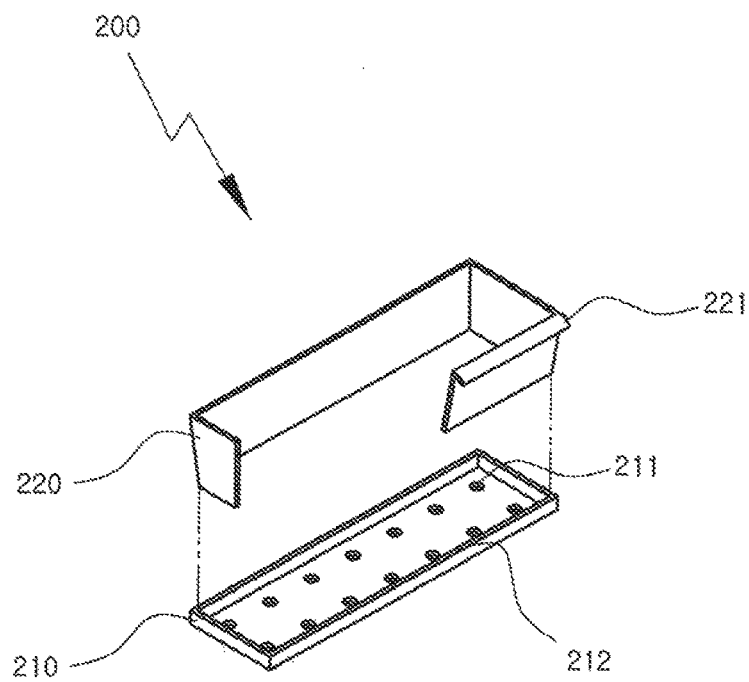
FIG. 3 illustrates an exploded perspective view of a growth module in accordance with the present disclosure.

Examples of various embodiments are illustrated in the accompanying drawings and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

Example embodiments will be described in more detail with reference to the accompanying drawings. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, s, operations, elements, and/or components, but do not preclude the presence or addition of one or more other features, integers, s, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Spatially relative terms, such as "beneath," "below," "lower," "under," "above," "upper," and the like, may be used herein for ease of explanation to describe one element or feature's relationship to another element s or feature s as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented for example, rotated 90 degrees or at other orientations, and the spatially relative descriptors used herein should be interpreted accordingly.

Hereinafter, a strawberry growth method in accordance with the present disclosure will be described in details with reference to the attached drawings.

The strawberry growth method in accordance with the present disclosure may use a strawberry growth module in accordance with the present disclosure which will be described in details. The strawberry growth method may include providing a multi-level support 100 in a plant growth facility. As described later, the growth modules 200 will be disposed on the multi-level support 100 (S100).

Then, a first bed-soil may be filled in at least one first growth module 200 in which at least one mother strawberry plant 400 will be transplanted (S200).

In this connection, the growth module 200 in accordance with the present disclosure may include a support plate 210 having multiple drain holes 211 formed therein and an edge protrusion 212 formed at an outer periphery thereof. The growth module 200 in accordance with the present disclosure may further include a hollow body 220 having open top and bottom portion, and having a curved guide portion 221 formed at an edge of the top portion. The curved guide portion 221 may be configured to prevent a runner from being damaged during guiding the runner. The hollow portion 220 may have a rectangular shape as viewed above. The hollow body 220 may be configured to be coupled or decoupled to or from the support plate 210.

Figure 5:
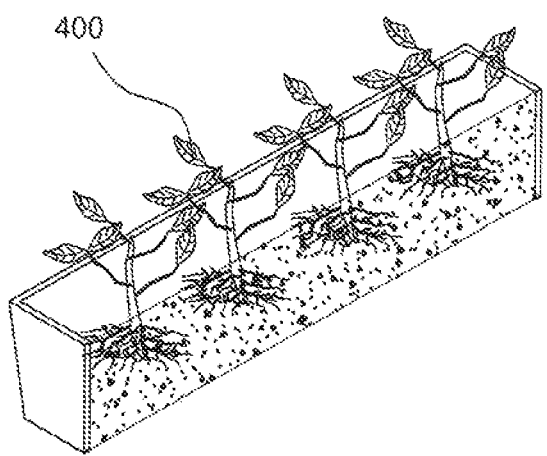
FIG. 5 illustrates a growth module in which grown strawberry plants are planted in accordance with the present disclosure.

As shown in FIG. 5, since the hollow body 220 may have the open bottom portion, and the hollow body 220 may be configured to be coupled or decoupled to or from the support plate 210, a child strawberry plant grown from the runner needs not to be pulled out from the growth module 200 and be transplanted into another growth place. Thus, this approach may allow significant reduction of labor powers and physical resources.

To the contrary, in the conventional approach, multiple runners may be individually guided from a pot and. Then, the individual runner may be raised individually. Thereafter, the raised plant may be transplanted into another place. During the transplanting, roots of the strawberry plant may be set apart from the plant. Further, the pulling-out process of the child strawberry plant from the pot may lead to increased labor powers.

Figure 4:
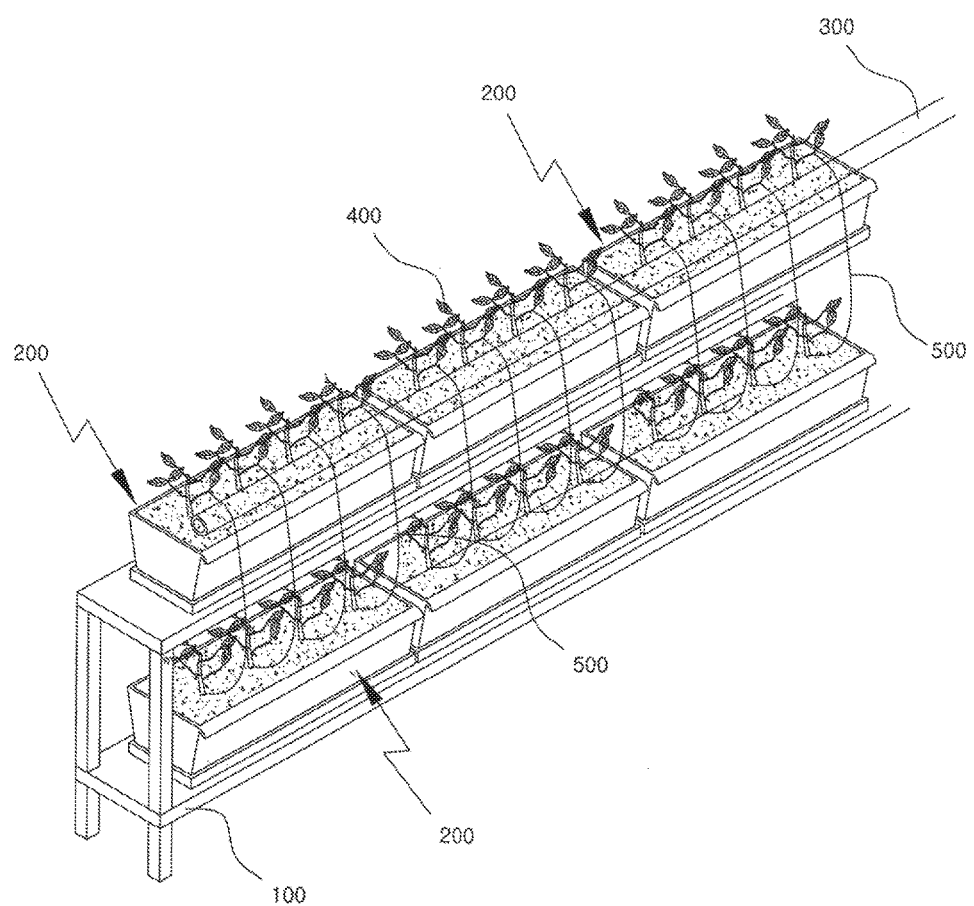
FIG. 4 illustrates a multi-level support where upper and lower growth modules are disposed in accordance with the present disclosure.

The mother strawberry plant may be raised on an upper level of the support 100 as shown in FIG. 4. In this connection, at an operation S300, at least one mother strawberry plant may be transplanted into the at least one first growth module 200 receiving the first bed-soil at the first bed-soil filling operation S200.

Then, the at least one first growth module 200 having the at least one mother strawberry plant may be placed on the upper level of the multi-level support 100. In this connection, the growth modules 200 may be arranged on the upper level in a linear or matrix manner (S400). Otherwise, the arrangement of the multiple growth modules 200 on the upper level may not limited thereto. As long as watering or nutrition-feeding is performed in an efficient way, different arrangements of the modules are possible.

Thereafter, the mother strawberry plant in the growth module 200 may be subjected to watering or nutrition-feeding (S500).

Then, a second bed-soil may be filled into at least one second growth module 200 (S600). In this connection, at least one runner from the mother strawberry plant in the first growth module 200 on the upper level will be guided into the second growth module as will be described later.

Next, the at least one second growth module 200 having received the second bed-soil may be placed on a lower level of the support 100 (S700). In this connection, the arrangement of the at least one second growth module 200 may correspond to the arrangement of the at least one first growth module 200.

When the second module placement operation S700 is performed, the mother strawberry 400 on the first growth module may have multiple runners extending therefrom.

Further, at this time, strawberry fruits may be harvested from the mother strawberry 400 on the first growth module.

Among the multiple runners extending from the mother strawberry 400 on the first growth module, a superior runner may be selected and only the superior runner may be guided to the second module 200 on the lower level (S800). In addition to this, remaining runners may be removed from the mother strawberry 400.

Thereafter, the first growth module 200 may be removed from the support 100 and the first bed-soil may be removed from the first growth module 200 (S900).

Then, the second growth module 200 may be displaced from the lower level to the upper level of the support (S1000). Thus, the runner on the second growth module 200 may be grown on the upper level of the support to become a new mother strawberry plant. Then, the strawberry fruits may be harvested from the new mother strawberry plant.

Regarding the displacement of the second growth module onto the upper level, the body 220 of the second module 200 may be removed from the support plate 210 and may be displaced onto the upper level.

Further, on the upper level, a watering pipe 300 may be disposed as shown in FIG. 4.

The operations S300 and S400 may be exchanged in an order thereof. That is, the first growth module may first be disposed on the upper level, and, then, the mother strawberry may be transplanted into the first growth module. In this specification, on the upper level of the support, the mother strawberry plant may be planted and grown, while, the runner from the mother strawberry plant on the upper level may be guided into the second growth module on the lower level of the support.

In the present disclosure, only the most superior runner from the mother strawberry plant on the upper level may be guided into the lower level, strawberry fruits harvest yield may improve compared to the conventional approach.

The main principle of the present disclosure may be based on the fact that the most superior runner is selected from the mother strawberry plant on the upper level and then is guided into the lower level and the most superior runner becomes a new superior mother strawberry plant, thereby to produce improved fruits quality and yield. This approach may be different from the conventional approach where fruits are harvested only from the mother strawberry plant individually grown in an individual pot.

The above description is not to be taken in a limiting sense, but is made merely for the purpose of describing the general principles of exemplary embodiments, and many additional embodiments of this disclosure are possible. It is understood that no limitation of the scope of the disclosure is thereby intended. The scope of the disclosure should be determined with reference to the Claims. Reference throughout this specification to "one embodiment," "an embodiment," or similar language means that a particular feature, structure, or characteristic that is described in connection with the embodiment is included in at least one embodiment of the present disclosure. Thus, appearances of the phrases "in one embodiment," "in an embodiment," and similar language throughout this specification may, but do not necessarily, all refer to the same embodiment.

What is claimed is:

1. A strawberry growth method comprising:
    providing a growth-module support including upper and lower levels;
    filling a first bed-soil in at least one first growth module;
    transplanting at least one mother strawberry plant into the
        at least one first growth module and then placing the at least one first growth module on the upper level of the support; or placing the at least one first growth module on the upper level of the support and then transplanting at least one mother strawberry plant into the at least one first growth module;

watering or nutrition-feeding the mother strawberry plant in the first growth module, to allow strawberry runners to extend from the mother strawberry plant;

filling a second bed-soil in at least one second growth module;

placing the at least one second growth module on the lower level of the support;

selecting the most superior runner from the multiple runners extending from the mother strawberry on the first growth module;

guiding only the selected most superior runner into the at least one second growth module, to allow the selected most superior runner to be planted into the at least one second growth module;

removing the first growth module from the support; and displacing the second growth module from the lower level to the upper level of the support; and growing the selected most superior runner on the upper level of the support to become a new mother strawberry plant.

2. The method of the claim 1, wherein a watering pipe is disposed on the upper level of the support.

3. The method of claim 1, wherein each of the first and second growth modules include a support plate having multiple drain holes formed therein and an edge protrusion formed at an outer periphery thereof; and a hollow body having open top and bottom portion, and having a curved guide portion formed at an edge of the top portion.

4. The method of claim 3, wherein the hollow portion has a rectangular shape as viewed above.

5. The method of claim 3, wherein the hollow body is configured to be coupled or decoupled to or from the support plate.

6. The method of claim 1, wherein the at least one first growth module comprises plural first growth modules and the at least one second growth module comprises plural second growth modules.

7. The method of claim 6, wherein the first growth modules are arranged on the upper level in a linear or matrix manner, and the second growth modules are arranged on the lower level in a linear or matrix manner, wherein the arrangement of the second growth modules corresponds to the arrangement of the first growth modules.

8. The method of claim 3, wherein when displacing the second growth module from the lower level to the upper level of the support, the body of the second module is removed from the support plate and is displaced onto the upper level.

* * * * *